US009896633B2

(12) United States Patent
Graf et al.

(10) Patent No.: US 9,896,633 B2
(45) Date of Patent: Feb. 20, 2018

(54) SYSTEMS AND METHODS FOR REDUCING CORROSION IN A REACTOR SYSTEM USING FLUID ENCASEMENT

(71) Applicant: Empire Technology Development LLC, Wilmington, DE (US)

(72) Inventors: Edwin X. Graf, Washington Island, WI (US); Robert Thomas Kery, Castle Cove (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 170 days.

(21) Appl. No.: 14/414,382

(22) PCT Filed: Jul. 23, 2013

(86) PCT No.: PCT/US2013/051613
§ 371 (c)(1),
(2) Date: Jan. 12, 2015

(87) PCT Pub. No.: WO2015/012806
PCT Pub. Date: Jan. 29, 2015

(65) Prior Publication Data
US 2016/0194569 A1    Jul. 7, 2016

(51) Int. Cl.
*B01J 7/00* (2006.01)
*C10J 3/78* (2006.01)
(Continued)

(52) U.S. Cl.
CPC .............. *C10J 3/78* (2013.01); *B01J 3/008* (2013.01); *B01J 4/002* (2013.01); *C01B 3/06* (2013.01);
(Continued)

(58) Field of Classification Search
CPC combination set(s) only.
See application file for complete search history.

(56) References Cited

U.S. PATENT DOCUMENTS 3,814,327 A * 6/1974 Dada ........................ B01J 4/001
239/290
4,546,603 A 10/1985 Arakawa et al.
(Continued)

FOREIGN PATENT DOCUMENTS

| CN | 101405230 A | 4/2009 |
|----|-------------|--------|
| CN | 102989371 A | 3/2013 |

(Continued)

OTHER PUBLICATIONS

POWER4Georgians! "Supercritical Power Plants," Updated on Feb. 12, 2008, accessed at http://web.archive.org/web/20120621173721/http://power4georgians.com/supercritical.aspx, accessed on Dec. 17, 2014, pp. 1-4.
(Continued)

*Primary Examiner* — Imran Akram
(74) *Attorney, Agent, or Firm* — Maschoff Brennan

(57) ABSTRACT

Systems and methods for reducing or eliminating corrosion of components of a reactor system, including a supercritical water gasification system, are described. The reactor system may include a reactor vessel configured to receive a reactor fluid through a reactor fluid inlet and a product source fluid corrosive to portions of the reactor system through a product source fluid inlet. The product source fluid may react with the reactor fluid to produce one or more reaction products, such as a fuel gas. The product source fluid inlet may be arranged within the reactor fluid inlet such that the product source fluid entering the reactor vessel is encased by a fluid conduit formed by the flow of reactor fluid entering the reactor vessel. The layer may operate to reduce corrosion by
(Continued)

forming a barrier between the product source fluid and the surface of the reactor fluid inlet and/or the reactor vessel.

12 Claims, 4 Drawing Sheets

(51) Int. Cl.
| | | |
|---|---|---|
| *C23F 15/00* | (2006.01) | |
| *F23G 5/48* | (2006.01) | |
| *B01J 3/00* | (2006.01) | |
| *B01J 4/00* | (2006.01) | |
| *C10L 3/08* | (2006.01) | |
| *C01B 3/06* | (2006.01) | |
| *C10J 3/72* | (2006.01) | |
| *C10L 3/00* | (2006.01) | |

(52) U.S. Cl.
CPC ............... *C10J 3/723* (2013.01); *C10L 3/00* (2013.01); *C10L 3/08* (2013.01); *C23F 15/00* (2013.01); *F23G 5/48* (2013.01); *C10J 2200/09* (2013.01); *C10J 2300/093* (2013.01); *C10J 2300/0916* (2013.01); *C10J 2300/0979* (2013.01); *C10L 2200/0469* (2013.01); *C10L 2270/04* (2013.01); *C10L 2270/06* (2013.01); *C10L 2290/04* (2013.01); *Y02E 60/36* (2013.01); *Y02P 20/544* (2015.11)

(56) References Cited

U.S. PATENT DOCUMENTS

| | | | | |
|---|---|---|---|---|
| 5,437,798 A * | 8/1995 | LaRoche | ............... | C02F 11/086 210/761 |
| 5,558,783 A | 9/1996 | McGuinness | | |
| 5,591,415 A * | 1/1997 | Dassel | ............... | B01J 3/00 422/241 |
| 5,804,066 A * | 9/1998 | Mueggenburg | ............ | B01J 3/00 210/177 |
| 6,228,224 B1 * | 5/2001 | Brooker | ............... | B01J 7/00 202/217 |
| 6,709,601 B2 | 3/2004 | Wofford, III et al. | | |
| 2002/0071798 A1 * | 6/2002 | DeCourcy | ............... | B01J 3/04 422/211 |
| 2003/0057164 A1 * | 3/2003 | Wofford, III | ............ | B01J 19/26 210/758 |
| 2006/0147853 A1 * | 7/2006 | Lipp | ............... | B01J 4/002 431/8 |
| 2007/0292340 A1 * | 12/2007 | Plischke | ............... | B01J 19/088 423/613 |
| 2009/0226351 A1 | 9/2009 | Rosenberg | | |
| 2010/0018933 A1 | 1/2010 | Titmas | | |
| 2012/0210633 A1 | 8/2012 | Bohlig et al. | | |
| 2013/0101500 A1 * | 4/2013 | Nikolov | ............... | B82Y 30/00 423/622 |

FOREIGN PATENT DOCUMENTS

| | | |
|---|---|---|
| DE | 3129665 A1 | 6/1982 |
| EP | 0135144 A1 | 3/1985 |
| WO | WO-02/40412 A1 | 5/2002 |

OTHER PUBLICATIONS

Hong, G.T., and Spritzer, M.H., "Supercritical Water Partial Oxidation," Proceedings of the 2002 U.S. DOE Hydrogen Program Review NREL/CP-610-32405, pp. 1-18 (2002).

International Search Report and Written Opinion for International Patent Application No. PCT/US2013/51613 dated Dec. 23, 2013.

Leusbrock, I., "Supercritical Fluids," Removal of Inorganic Compounds via Supercritical Water: Fundamentals and Applications, Chapter 2, Thesis, pp. 39-55 (2011).

Marrone, P.A., and Hong, G.T., "Corrosion control methods in supercritical water oxidation and gasification processes," The Journal of Supercritical Fluids, vol. 51, No. 2, pp. 83-103 (Dec. 2009).

Kritzer, P., "Corrosion in high-temperature and supercritical water and aqueous solutions: a review," The Journal of Supercritical Fluids, vol. 29, No. 1-2, pp. 1-29 (Apr. 2004).

Peterson, A.A., et al., "Thermochemical biofuel production in hydrothermal media: A review of sub-and supercritical water technologies," Energy & Environmental Science, vol. 1, No. 1, pp. 32-65 (Jul. 9, 2008).

Reese, R.A., et al., "Headbox approach piping guidelines," TAPPI, TIP 0404-54, pp. 1-36 (Jan. 2012).

Wang, J., and Takarada, T., "Supercritical Water Gasification of Coal Using Ca(OH), as an Additive," Reprints of Symposia-Division of Fuel Chemistry, American Chemical Society, vol. 45, No. 3, 2000, accessed at http://web.anl.gov/PCS/acsfuel/preprint%20archive/Files/45_3_WASHINGTON%20DC_08-00_0573.pdf, accessed on Dec. 17, 2014, pp. 573-576.

* cited by examiner

SYSTEMS AND METHODS FOR REDUCING CORROSION IN A REACTOR SYSTEM USING FLUID ENCASEMENT

CROSS REFERENCE TO RELATED APPLICATION

This application is a U.S. National Stage Application under 35 U.S.C. § 371 of International Application Serial No. PCT/US2013/051613, filed on Jul. 23, 2013, the entire disclosure of which is hereby incorporated by reference for all purposes in its entirety.

BACKGROUND

Reactor systems are capable of generating fuel from materials that are typically considered waste, such as liquid biomass, or unclean fuel sources, including coal and other fossil fuels. For example, a supercritical water gasification system may produce hydrogen-rich synthesis gas by reacting a coal slurry with supercritical water, which is water that is heated to very high temperatures (for instance, above about 400° C.) under high pressure (for instance, about 22 megapascals). Supercritical water is very reactive and is able to break down the slurry to generate the hydrogen-rich fuel. The fuel may be used for various purposes, such as powering an engine, producing electricity and generating heat.

Due to the harsh conditions that occur during the reaction process, system components are susceptible to corrosion and breaking down. Accordingly, the efficiency and cost-effectiveness of a reactor system is subject to the rate of corrosion of system components, such as heaters and reactor vessels that come into contact with reactor materials. Management of corrosion typically involves the constant replacement of corroded parts or constructing components from corrosion-resistant materials, which can be expensive and largely ineffective. It will therefore be desirable to reduce corrosion in reactor systems through the use of components configured to eliminate contact between system components and damaging reactor process elements.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a reactor system configured to reduce corrosion of portions thereof may comprise at least one reactor vessel, at least one reactor fluid inlet, at least one product source fluid inlet, and at least one product outlet. The reactor vessel may comprise an inner surface and may be configured to receive a reactor fluid through the at least one reactor fluid inlet and to receive a product source fluid corrosive to at least a portion of the inner surface through the at least one product source fluid inlet. The at least one product outlet may be configured to provide a discharge path for the reactor fluid and reaction product substances generated by a reaction of the product source fluid with the reactor fluid within the at least one reactor vessel. The at least one product source fluid inlet may be arranged within at least a portion of the at least one reactor fluid inlet such that a flow of the product source fluid within the at least one reactor vessel is substantially surrounded by a flow of the reactor fluid, the reactor fluid thereby operating to reduce corrosion by forming a barrier between the product source fluid and the at least a portion of the inner surface.

In an embodiment, a method of reducing corrosion in a reactor system may comprise providing at least one reactor vessel comprising an inner surface and configured to receive a reactor fluid through at least one reactor fluid inlet and to receive a product source fluid corrosive to at least a portion of the inner surface through at least one product source fluid inlet. At least a portion of the at least one product source fluid inlet may be arranged within at least a portion of the at least one reactor fluid inlet such that a flow of the product source fluid within the at least one reactor vessel is substantially surrounded by the reactor fluid. The reactor vessel may receive the reactor fluid through the at least one reactor fluid inlet and may receive the product source fluid through the at least one product source fluid inlet such that the product source fluid reacts with the reactor fluid to generate reaction product substances. Corrosion may be reduced by the reactor fluid forming a barrier between the product source fluid and the at least a portion of the inner surface. The reactor fluid and the reaction product substances may be discharged through at least one product outlet in fluid communication with the reactor vessel.

In an embodiment, a method of manufacturing a reactor system configured to reduce corrosion thereof may comprise providing at least one reactor vessel comprising an inner surface. The at least one reactor vessel may be configured to receive a reactor fluid through at least one reactor fluid inlet and to receive a product source fluid corrosive to at least a portion of the inner surface through at least one product source fluid inlet. The at least one product source fluid inlet may be within at least a portion of the at least one reactor fluid inlet such that a flow of the product source fluid within the at least one reactor vessel is substantially surrounded by a flow of the reactor fluid, the reactor fluid thereby operating to reduce corrosion by forming a barrier between the product source fluid and the at least a portion of the inner surface. At least one product outlet may be configured to discharge the reactor fluid and reaction product substances generated by a reaction of the product source fluid with the reactor fluid within the at least one reactor vessel.

DETAILED DESCRIPTION

Figure 1:
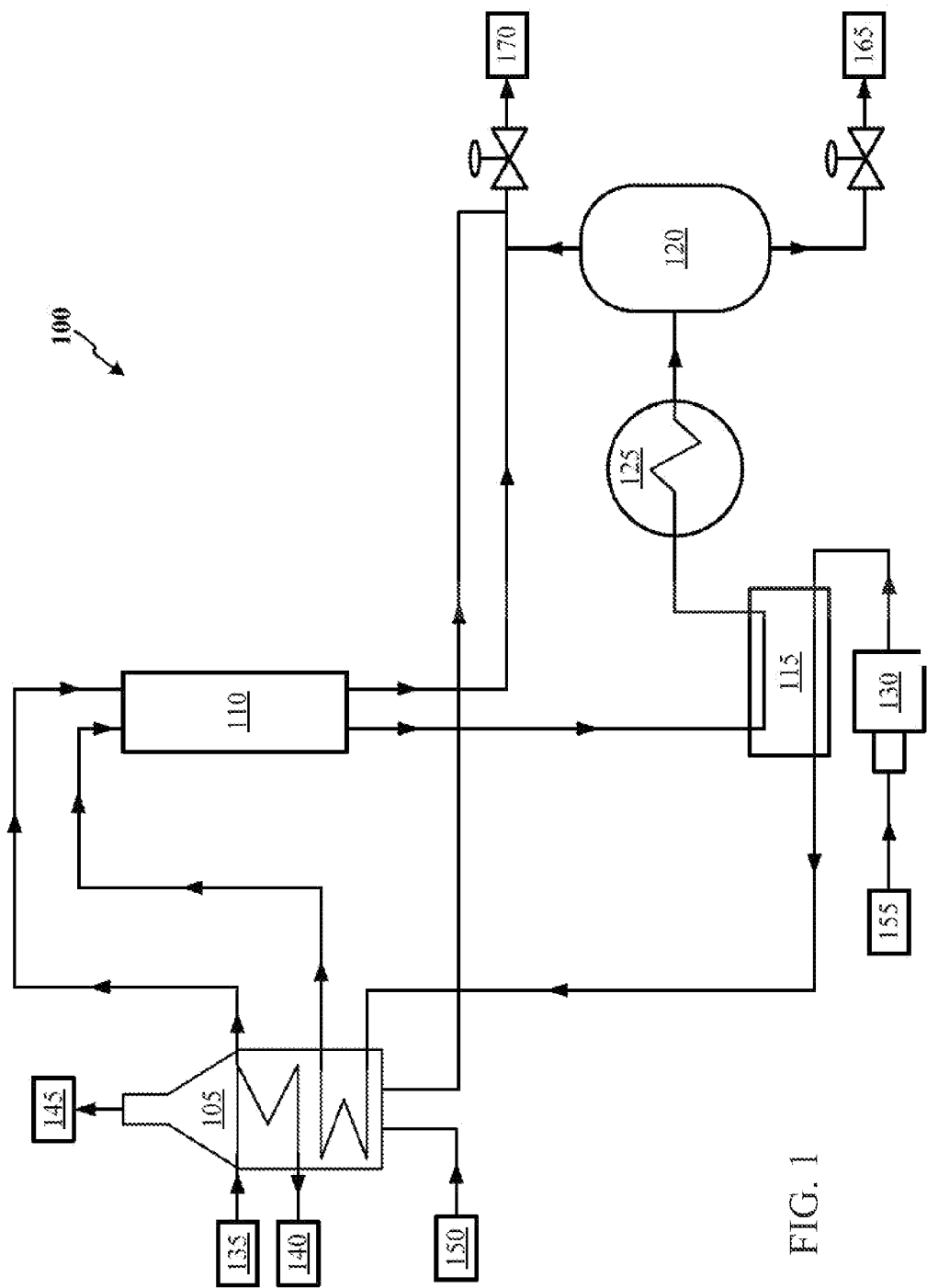
FIG. 1 depicts an illustrative reactor system according to some embodiments.

The terminology used in the description is for the purpose of describing the particular versions or embodiments only, and is not intended to limit the scope.

The described technology relates generally to systems and methods for reducing or eliminating corrosion in reactor systems. The reactor systems may include supercritical water reactor systems, such as a supercritical water gasification system. In particular, embodiments provide systems and methods for reducing contact between corrosive reactor system fluids, such as product source fluids and/or reactor fluids, and the surfaces of reactor system components. Some embodiments include a reactor vessel configured to receive a product source fluid encased in a reactor fluid. For example, the product source fluid may enter the reactor vessel through a product source fluid inlet arranged at least partially within a reactor fluid inlet. The pressure of the reactor fluid entering the reactor vessel may be sufficient to enclose the product source fluid flowing therein. The reactor fluid may form a barrier preventing or substantially preventing the product source fluid from contacting surfaces of the reactor vessel, thereby reducing or eliminating corrosion of the reactor vessel.

Non-limiting examples of product source fluids include coal slurry, coal dust, liquid biomass, pulverized toxic waste, pulverized electronic waste ("e-waste"), or the like. A non-limiting example of a reactor fluid includes water, such as supercritical water and/or subcritical water. Supercritical water may include water at a pressure of about 22 megapascals to about 35 megapascals and at a temperature of about 375° C. to about 900° C. Subcritical water generally includes water at an elevated pressure having a temperature below the temperature of supercritical water. For example, subcritical water may include water at a pressure of about 22 megapascals to about 30 megapascals at a temperature of about 275° C. to about 375° C. Supercritical water without or substantially without corrosive ions (for example, heteroatoms) may be non-corrosive to reactor system components formed from materials known to those having ordinary skill in the art.

According to some embodiments, the product source fluid and the reactor fluid may enter the reactor vessel at temperatures and pressures that are non-corrosive or substantially non-corrosive to surfaces of the reactor vessel and components thereof. For example, the reactor fluid may include supercritical water devoid of corrosive ions, and the product source fluid may include a slurry at a temperature and pressure that are outside of a high-corrosion level of the slurry.

The product source fluid may react with the reactor fluid to generate reaction product substances, such as fuel products. The reaction of the product source fluid and the reactor fluid may occur within the barrier formed by the flow of reactor fluid within the reactor fluid inlet and/or the reactor vessel. Embodiments provide that the reactor vessel may include a trap configured to receive waste products resulting from the conversion of the product source fluid into fuel products, including, without limitation, salts, char, thorium, and mercury. The supercritical water and the fuel products may be discharged from the reactor vessel through a product outlet.

Use of the described technology can result in a reduction or elimination of corrosion in reactor system components relative to operation of the same or similar reactor system components without the described methods and materials. The degree of corrosion can generally be reduced by any amount. For example, the degree of corrosion can be reduced by at least about 10%, at least about 20%, at least about 30%, at least about 40%, at least about 50%, at least about 60%, at least about 70%, at least about 80%, at least about 90%, at least about 95%, at least about 96%, at least about 97%, at least about 98%, at least about 99%, and in an ideal situation, about 100% reduction (complete elimination of corrosion).

FIG. 1 depicts an illustrative reactor system according to some embodiments. As shown in FIG. 1, a reactor system 100 may be configured as a supercritical water gasification system. A product source fluid in the form of a slurry 155 may be introduced into the reactor system 100 through a slurry inlet 130, which may include, for example, a high pressure slurry feed. The slurry 155 may include any type of material capable of undergoing supercritical water gasification, including, without limitation, biomass fluids (for example, micro algae fluids, bioresidues, biowastes, or the like), slurries of coal and other fossil fuels (for example, pulverized coal and water), solid materials (for example, coal dust), and oxidizable wastes (for example, toxic waste and e-waste). Accordingly, the supercritical water reactor system 100 may be configured to operate as any of various gasification systems, including, without limitation, a coal gasification system, a biomass gasification system, a toxic waste gasification system, an e-waste gasification system, and a waste oxidation system. The slurry 155, along with air 150 and water 135, may be fed into a heater 105, or a pre-heater, such as a gas-fired heater. Although only one heater 105 is depicted in FIG. 1, a reactor system 100 configured according to some embodiments may include multiple heaters, such as one or more heaters for the water 135 and one or more heaters for the slurry 155. The water 135 and the slurry 155 may be heated in the heater 105. Certain gases, such as steam 140 and flue gas 145, may be exhausted from the heater 105, for instance, to maintain pressure.

The slurry 155 and the water 135 may be fed into a reactor vessel 110. Within the reactor vessel 110, the slurry 155 may come into contact with the water 135 at a supercritical temperature and pressure ("supercritical water"). Under supercritical conditions, the slurry 155 may include corrosive ions such as the ions of various inorganic salts. The corrosive ions may be highly corrosive to the components of the reactor system 100, such as the inside surface of the reactor vessel 110. According to some embodiments, the temperature of the slurry 155 may be below supercritical temperatures such that the slurry 155 does not include or substantially does not include corrosive ions.

The supercritical water 135 may react with the components of the slurry 155 within the reactor vessel 110 to generate one or more reaction product substances that may be dissolved in the water 135. In an embodiment, the slurry 155 may include one or more catalysts configured to facilitate the reaction, such as chlorine, sulfate, nitrate, and phosphate. The one or more reaction product substances, within the water 135, may move through one or more heat exchangers, such as a heat recovery heat exchanger 115 and a cool-down heat exchanger 125. A gas/liquid separator 120 may be provided to separate the one or more reaction product substances into the desired reaction products 165, such as fuel gas products, and waste products 170, such as liquid effluent, ash and char. In an embodiment, all or some of the waste products 170 may be collected in a trap (not shown, see FIGS. 2A and 2B) arranged within the reactor vessel 110. In such an embodiment, at least a portion of the waste products 170 may exit the reactor vessel through a waste outlet (described in more detail with reference to FIGS. 2A and 2B). The reaction product 165 may include any fuel capable of being generated from the slurry 155 responsive to reacting with the supercritical water 135, including gas, solid and/or liquid materials. Illustrative reaction products 165 include, but are not limited to, CO, $CO_2$ and hydrogen-rich fuels, such as $H_2$ and/or $CH_4$.

During the supercritical water gasification process, the slurry 155 may be heated to various temperatures under different pressures within the reactor system 100. In addition to supercritical conditions, the slurry 155 may be in a subcritical condition, in which the fluid within the slurry is at an elevated pressure and at a temperature that is below a supercritical temperature. In an embodiment where the fluid within the slurry 155 includes water, a subcritical temperature may be about 275° C. to about 375° C. For example, the subcritical temperature may be about 275° C., about 300° C., about 325° C., about 350° C., about 375° C., or in a range between any of these values (including endpoints). In an embodiment where the fluid within the slurry 155 includes water, the pressure of the fluid at the subcritical temperature may be about 20 megapascals to about 35 megapascals. For example, the pressure of the fluid at the subcritical temperature may be about 20 megapascals, about 22 megapascals, about 25 megapascals, about 28 megapascals, about 30 megapascals, about 35 megapascals, or in a range between any of these values (including endpoints). The slurry 155 under subcritical conditions typically includes corrosive ions that are highly corrosive to the components of the reactor system 100. Non-limiting examples of corrosive ions include various ions of chlorine, sulfur (for example, sulphate ions), and/or phosphorous.

The reactor system 100 depicted in FIG. 1 is provided for illustrative purposes only and may include more or fewer components arranged in one or more configurations, sequences, connections, or the like, such as one or more valves, pre-heaters, reactor vessels, pumps for pumping the slurry 155 through the system, and other components known to those having ordinary skill in the art.

Supercritical water gasification systems, such as the illustrative reactor system 100 depicted in FIG. 1, may be configured to generate relatively clean energy from various grades of coal or biomass rapidly and with minimal polluting effluents. In addition, supercritical water gasification systems may generate fuel with greater efficiency than conventional gasification systems, such as pulverized coal gasification systems. However the high pressures and high temperatures within a reactor vessel during the gasification process create a harsh, corrosive environment that places severe constraints on reactor design. For instance, conventional system components, such as reactor vessels, suffer from degradation of the reactor components due to corrosion, necessitating frequent, time-consuming and expensive maintenance. The maintenance requirements can greatly affect the reactor cost dynamics, preventing large scale commercial implementation of supercritical water gasification technology.

Corrosion in supercritical water gasification systems is affected by a number of factors including some that are unique to the supercritical water environment. For example, fuel sources may include corrosive ions, such as ions of chlorine, sulfur, phosphorus and nitrogen, that may become free ions at supercritical temperatures and pressures. In addition, at pressures above about 8 megapascals and temperatures above about 300° C., the ionic product of water increases rapidly from about $1\times10^{-45}$ $mol^2/l^2$ to about $1\times10^{-12}$ $mol^2/l^2$. As known to those having ordinary skill in the art, the ionic product, $K_i$, is generally a measure of the tendency of an amphiprotic solvent, XH, to take up or to lose a hydron in the following reaction: $XH+XH=XH_2^++X^-$. In such a reaction, $K_i=a_{XH_2^+}\times a_{X^-}$, where $a_{XH_2}^+$ and $a_X^-$ are the activities of $XH_2^+$ and $X^-$, respectively. The ionic product of water, $K_W$, is given by the following: $K_W=a_{H_3O^+}\times a_{OH^-}$; $K_W\approx1\times10^{-14}$ $mol^2dm^{-6}$ at 25° C. The increased ionic product of water under supercritical conditions causes, among other things, the dissociation of inorganic compounds within the water and/or a fuel product that includes water. The free inorganic compounds may act to cause the corrosion of component surfaces that come in contact therewith.

Furthermore, above the critical point of water (for example, above about 374° C. and about 23 megapascals), the solubility of inorganic salts decreases rapidly, causing inorganic salts in reactor fluids and/or product source fluids to precipitate and attach to reactor wall surfaces. The precipitated inorganic salts can clog pipes and/or collect on reactor walls and create sites for corrosion. It is this relatively high ionic product in the supercritical water gasification environment and the availability of free hetero ions that makes the supercritical water gasification environment so corrosive to system components.

While many materials have been engineered to withstand high temperatures and pressures, much in excess of those required in a supercritical water gasification reactor, the addition of reactive free ions under supercritical conditions causes corrosion of these materials. Illustrative and non-restrictive materials include, without limitation, Inconel® of the Special Metals Corporation (Huntington, W. Va., USA), Hastelloy®N of Haynes International, Inc. (Kokomo, Ind., USA), stainless steel, and various metals and metal alloys, such as nickel, iron and titanium, and any other type of material known to those having ordinary skill in the art, such as those used in conventional supercritical electric power generation boilers. As such, materials known to those having ordinary skill in the art exhibit various forms of corrosion when exposed to reactive ions under supercritical conditions. Accordingly, embodiments may be configured to reduce or eliminate corrosion within a reactor system by preventing or diminishing contact between corrosive reactor system fluids and system components.

Figure 2A:
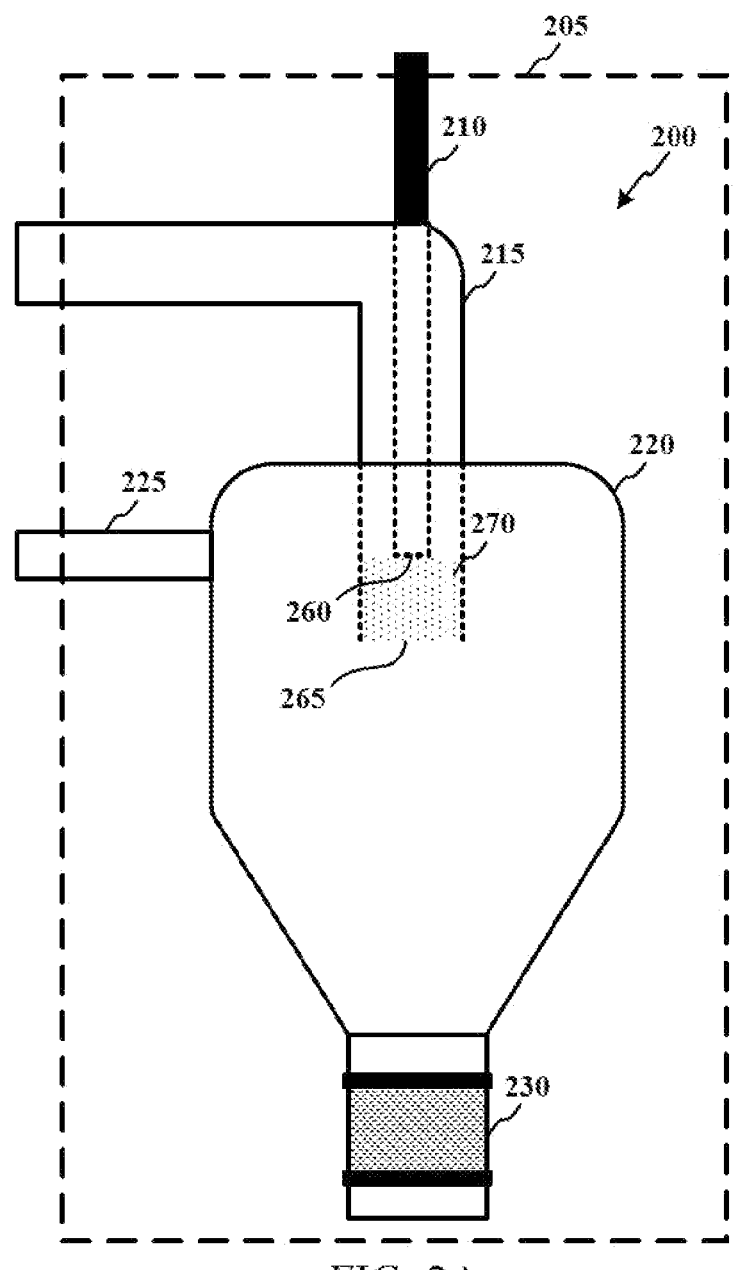
FIG. 2A depicts an illustrative reactor vessel according to some embodiments.

FIG. 2A depicts an illustrative reactor vessel according to some embodiments. A reactor vessel 200 may be arranged within a reactor system 205, such as the supercritical water gasification reactor system 100 depicted in FIG. 1. The reactor vessel 200 may include a pressure vessel 220 configured as an outer shell for housing the reaction for converting a product source fluid into one or more reaction product substances, such as a fuel product, according to embodiments described herein. In an embodiment, the pressure vessel and/or components thereof may be insulated, for example, to minimize heat loss. A reactor fluid may enter the pressure vessel 220 through a reactor fluid inlet 215. In an embodiment, the reactor fluid may include supercritical water, for instance, water at a pressure of about 22 megapascals to about 35 megapascals and at a temperature of about 450° C. to about 900° C. In an embodiment, the temperature of the supercritical water may be about 600° C. to about 900° C. In an embodiment, the temperature of the supercritical water may be about 650° C.+/−50° C.

A product source fluid may enter the pressure vessel 220 through a product source fluid inlet 210. The product source fluid inlet 210 may be arranged within the reactor fluid inlet 215. In an embodiment, the product source fluid inlet 210 and the reactor fluid inlet 215 may be arranged in various configurations. For example, the product source fluid inlet 210 and the reactor fluid inlet 215 may be arranged as a radius elbow (as shown in FIG. 2A), as an acceleration or venturi elbow arrangement, or combinations thereof. For embodiments including an acceleration elbow, the ratio change in cross-sectional area may be about 1.3:1 to about 3:1. For example, the ratio change in the cross-sectional area may be about 1.3:1, about 1.5:1, about 2:1, about 3:1, and ranges between any two of these values (including endpoints).

The reactor fluid inlet 210 may extend beyond the product source fluid inlet 215 into the at least one reactor vessel 200 for a certain distance. In an embodiment, the distance may be about 0.1 meters to about 5 meters. For example, the distance may be about 0.1 meters, about 0.25 meters, about 0.5 meters, about 1 meter, about 2 meters, about 3 meters, about 4 meters, about 5 meters, and ranges between any two of these values (including endpoints). In an embodiment, the distance may be about 0.25 meters to about 2 meters. An opening 260 in the product source fluid inlet 210 where the product source fluid is released into the pressure vessel 220 may be located within the reactor fluid inlet 215, above an opening 265 in the reactor fluid inlet. As such, the product source fluid may contact the reactor fluid and react therewith at least partially within the reactor fluid inlet 215, for example, within the shaded area 270. The size of the area 270 within the reactor fluid inlet 215 may be based on various factors, including the flow rate of the reactor fluid and/or product source fluid, the time required for conversion, or combinations thereof.

The pressure vessel 220 may have dimensions (for example, height, width, diameter, or the like) and a shape (for example, cylindrical, venturi-based shape, or the like) based on various factors. For example, the dimensions and shape of the pressure vessel 220 may depend on the throughput of the product source fluid and/or reactor fluid in which greater throughput may require a greater reaction time and, therefore, a larger pressure vessel. According to some embodiments, a pressure vessel 220 may be configured to receive a coal-based reactor fluid, such as a pulverized coal slurry, with a throughput of about 2000 tons per about 24 hours. In another example, the dimensions and shape of the pressure vessel 220 may be configured such that the reactor fluid and/or any reaction zone associated therewith does not contact the sides of the pressure vessel.

Figure 2B:
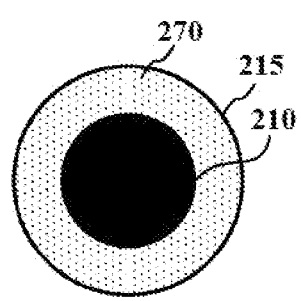
FIG. 2B depicts a bottom-up view of the product source fluid inlet arranged within the reactor fluid inlet.

FIG. 2B depicts a bottom-up view of the product source fluid inlet 210 arranged within the reactor fluid inlet 215. As shown in FIG. 2B, the reactor fluid inlet 215 may be configured to surround the product source fluid inlet 210. As such, the reactor fluid flowing into the reactor vessel 200 may encase the product source fluid flowing into the reactor vessel.

Referring back to FIG. 2A, the product source fluid may enter the reactor vessel 200 encased by the reactor fluid entering the reactor vessel through the reactor fluid inlet 215. For example, the flow of the reactor fluid exiting the reactor fluid inlet 215 may form a fluid conduit through which the product source fluid may flow into the pressure vessel 220. As such, the reactor fluid provides a physical barrier between the product source fluid and the inner surface of the reactor fluid inlet 215 and the pressure vessel 220. In this manner, contact between the product source fluid and the surfaces of the reactor fluid inlet 215 and the reactor vessel 220 are reduced or eliminated, diminishing the corrosive effects of the product source fluid. The thickness of the barrier may depend on various factors, such as the type of reactor fluid and/or product source fluid, fluid velocities, reaction temperature, or the like. In an embodiment, the thickness of the barrier may be about 0.5 centimeters to about 15 centimeters. For example, the thickness of the barrier may be about 0.5 centimeters, about 1 centimeter, about 5 centimeters, about 10 centimeters, about 15 centimeters, and ranges between any two of these values (including endpoints). In an embodiment, the thickness of the barrier may be about 1 centimeter to about 5 centimeters.

According to some embodiments, the product source fluid flowing within the product source fluid inlet 210 may be heated by the reactor fluid flowing within the reactor fluid inlet 215 in contact with the product source fluid inlet. As the product source fluid contacts the reactor fluid within the reactor vessel 220, the product source fluid may be heated by the higher temperature reactor fluid, reacting with the reactor fluid to generate one or more reactor products. Conversion of the product source fluid into the one or more reactor products may generate waste, such as mercury, effluent, salts, and char. The reactor vessel 200 may include a trap 230 configured to collect waste to allow, among other things, the reactor fluid to be re-used within the reactor system 205 and/or an external system (for instance, a steam turbine). The reactor products and the reactor fluid may exit from the pressure vessel 220 through an outlet 225 and into the reactor system 205 for further use and/or processing according to some embodiments described herein.

In an embodiment, the product source fluid may include any type of fluid capable of generating a product within a reactor system configured according to some embodiments described herein. For instance, the product source fluid may include biomass, toxic waste, e-waste, or fossil fuel slurries. In an embodiment, the product source fluid may include a coal slurry. In an embodiment, the coal slurry may include a slurry of pulverized coal having a concentration by weight of coal of about 2% to about 25%. For example, the concentration by weight of coal in the slurry may be about 2%, about 5%, about 10%, about 15%, about 20%, about 25%, and ranges between any two of these values (including endpoints). The concentration of coal may depend on various factors, such as the surface area to volume ratio within the reactor vessel, for example, to maximize the reaction kinetics therein.

The product source fluid may enter the pressure vessel 220 at various pressures, such as at various supercritical pressures. For example, the product source fluid may enter the pressure vessel 220 at a pressure of about 20 megapascals to about 35 megapascals. In further examples, the pressure may be about 20 megapascals, about 22 megapascals, about 25 megapascals, about 28 megapascals, about 30 megapascals, about 35 megapascals, about 40 megapascals, or ranges between any two of these values (including endpoints). In an embodiment, the product source fluid may enter the pressure vessel 220 at a pressure of about 22 megapascals to about 35 megapascals.

The product source fluid may enter the pressure vessel 220 at various temperatures, such as at various subcritical temperatures. For instance, the product source fluid may enter the pressure vessel 220 at a temperature of equal to or below about 300° C. In an embodiment, the temperature may be about 200° C. to about 300° C. In further examples, the temperature may be about 200° C., about 250° C., about 300° C., or ranges between any two of these values (including endpoints). The product source fluid may enter the pressure vessel 220 in a low-corrosive state, for instance, at a supercritical pressure and at a subcritical temperature.

The product source fluid may enter the pressure vessel 220 at various velocities or flow rates, for example, relative to the flow rate of the reactor fluid. According to some embodiments, the reactor fluid may enter the pressure vessel 220 at a flow rate of about 0.05 meters/second to about 10 meters/second. For example, the flow rate may be about 0.05 meters/second, about 0.5 meters/second, about 1 meter/second, about 2.5 meters/second, about 5 meters/second, about 10 meters/second, and ranges between any two of these values (including endpoints). In an embodiment, the flow rate of the reactor fluid may be about 0.5 meters/second to about 5 meters/second. According to some embodiments, the product source fluid may have a flow rate that is lower than the flow rate of the reactor fluid by about 5% to about 25%. For example, the flow rate of the product source fluid may be lower than the flow rate of the reactor fluid by about 5%, about 10%, about 15%, about 20%, about 25%, and ranges between any two of these values (including endpoints).

In an embodiment, the product source fluid may have a flow rate that is about 5% to about 25% greater than the flow rate of the surrounding reactor fluid, for instance, to maximize radial mixing and therefore, to achieve more efficient conversion of the product source fluid into product gases. In such an embodiment, the flow rate of the product source fluid may be greater than the flow rate of the reactor fluid by about 5%, about 10%, about 15%, about 20%, about 25%, and ranges between any two of these values (including endpoints). In an embodiment, the flow rate of the product source fluid may be about 20% greater than the flow rate of the surrounding reactor fluid.

In an embodiment, the reactor system may include one or more pumps, one or more heaters, and/or one or more heat exchangers in fluid communication with the reactor vessel 200 to control the temperature, pressure, and/or flow rate of the product source fluid and/or the reactor fluid entering the reactor vessel.

The pressure vessel 220 and other components of the reactor vessel 200, such as the product fluid inlet 210, the reactor fluid inlet 215 and the outlet 225 may be fabricated from various materials. Illustrative and non-restrictive examples of such materials include common corrosion resistant metals and alloys thereof including, without limitation, nickel, chrome-molybdenum, non-magnetic iron, various ceramic materials, Inconel®, Hastelloy® N, stainless steel, titanium, and combinations thereof.

Figure 2C:
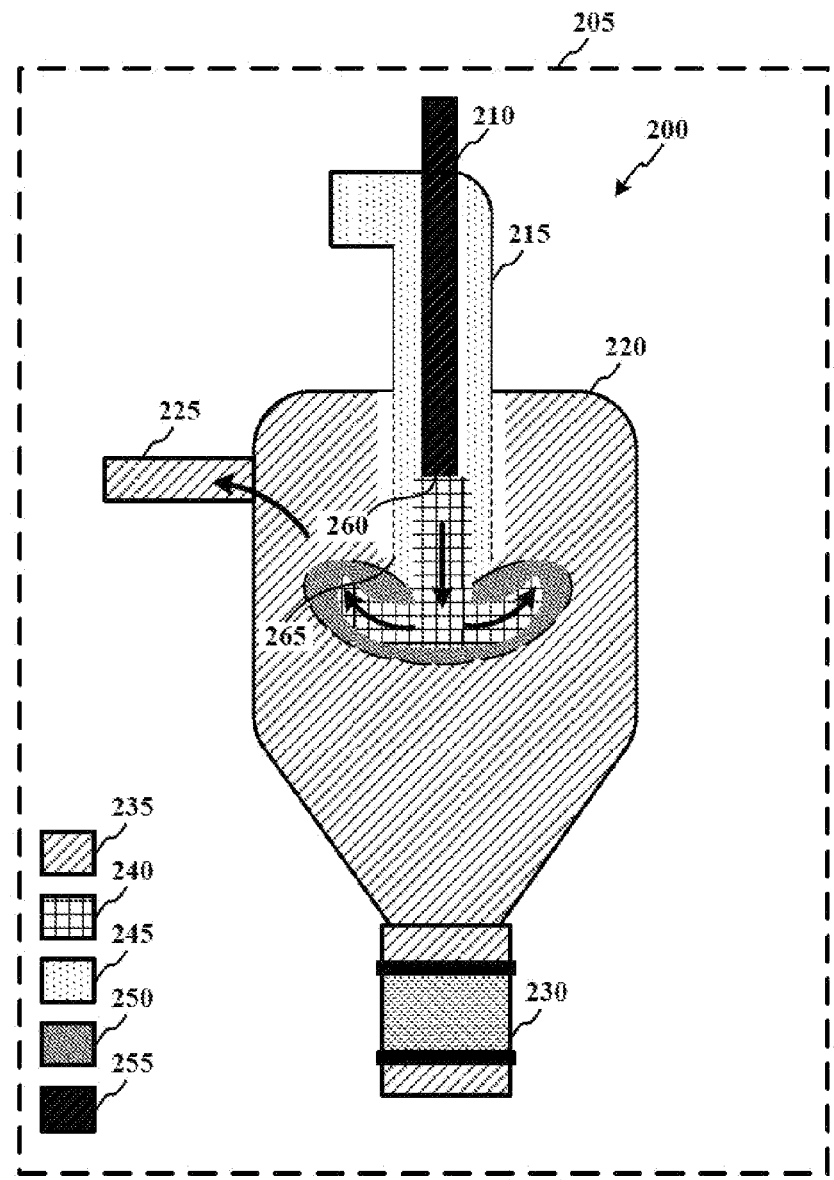
FIG. 2C depicts an illustrative product source fluid conversion process within a reactor vessel configured according to some embodiments.

FIG. 2C depicts an illustrative product source fluid conversion process within a reactor vessel configured according to some embodiments. As shown in FIG. 2C, a product source fluid may enter the pressure vessel 220 through the product source fluid inlet 210. According to some embodiments, the product source fluid may enter the pressure vessel 220 at a supercritical pressure and at a temperature below a corrosive temperature (for example, below a temperature in which a threshold level of corrosive ions are in solution). For example, the product source fluid may include a slurry of pulverized coal at a supercritical pressure of about 20 megapascals to about 30 megapascals and at a subcritical temperature of equal to or less than about 300° C. In an embodiment, the product source fluid may include pulverized coal at a supercritical pressure of about 22 megapascals to about 30 megapascals. In an embodiment, the product source fluid may include pulverized coal at a subcritical temperature of about 200° C. to about 300° C. The reactor fluid may enter the pressure vessel 220 through the reactor fluid inlet 215 at a supercritical pressure and supercritical temperature. For instance, the reactor fluid may include water at a pressure of about 22 megapascals to about 35 megapascals and at a supercritical temperature of about 650° C. According to some embodiments, the temperature of the reactor fluid 220 within the pressure vessel 220 is above supercritical temperatures, for example, from about 375° C. to about 900° C. In an embodiment, the temperature of the reactor fluid may be about 600° C. to about 900° C.

During the reactor process, one or more temperature zones 235-255 may be present within the reactor vessel 200 and components thereof. For example, the product source fluid inlet 210 may include a product source fluid temperature zone 255 including a product source fluid at a subcritical temperature. According to some embodiments, the product source fluid within the product source fluid inlet 210 may be heated by the reactor fluid flowing within the reactor fluid inlet 215 in contact with the product source fluid inlet. A supercritical temperature zone 245 may include a reactor fluid at a supercritical temperature, such as supercritical water at a temperature of about 650° C. to about 900° C.

The product source fluid may enter the pressure vessel 220 encased by the reactor fluid. The product source fluid may be converted to reaction product substances, such as one or more gas products, by reacting with the reactor fluid within a reaction zone 240. The temperature within the reaction zone 240 may be the temperature required to allow the product source fluid to react with the reactor fluid, for example, about 650° C. As such, the temperature of the product source fluid may rise rapidly to the reaction temperature after entering the pressure vessel 220 and contacting the reactor fluid. The product source fluid may remain encased in the reactor fluid throughout all or substantially all of the conversion process. In this manner, the product source fluid at a supercritical temperature may not contact any surfaces of the reactor vessel 200, such as the product source fluid inlet 210, the inner surface of the pressure vessel 220 and/or the outlet 225.

Gasification of the product source fluid may occur substantially within the portion of the reactor fluid inlet 215 below the opening 260 in the product source fluid inlet 210 (the "reaction zone"). For example, gasification may occur in about 30 seconds (the "gasification reaction time") after the product source fluid contacts the reactor fluid within the reactor fluid inlet 215. The gasification reaction time may be influenced by various factors, such as the granularity and/or concentration of the product source fluid, size and shape of solid particles within the product source fluid, the velocity of the fluid flows, the temperature and/or pressure within the pressure vessel 220, and/or the geometry of the pressure vessel. According to some embodiments, gasification may occur in about 1 seconds to about 60 seconds. For example, the gasification may occur in about 15 seconds, about 20 seconds, about 25 seconds, about 30 seconds, about 45 seconds, about 60 seconds, and ranges between any two of these values (including endpoints). According to some embodiments, the length of the reactor fluid inlet 215 may be determined based on, among other things, the flow rate of the product source fluid exiting from the opening 260 and the rate of conversion of the product source fluid.

The one or more reaction products, such as gas products, resulting from the conversion of the product source fluid may be dissolved in the reactor fluid. According to some embodiments, the pressure in the pressure vessel 220 may be about 22 megapascals to about 35 megapascals and the temperature may be about 650° C.+/−50° C. In an embodiment, the pressure in the pressure vessel 220 may be maintained at or above supercritical pressures. As such, the reactor fluid may remain in the supercritical state throughout the process depicted in FIG. 2C, and any gas products may remain dissolved in the fluid as it exits through the outlet 225.

An outer reaction zone 250 may include fluid that is slightly less than the temperature of the reaction zone 240. For instance, if the temperature of the reaction zone 240 is about 650° C., then the temperature of the outer reaction zone 250 may be about 640° C. The remainder of the pressure vessel 220 may include a sub-reaction zone 235 including fluid (for example, reactor fluid) at supercritical temperatures and supercritical pressures that may be lower than the temperatures and/or pressures with the reaction zones 240, 250. For example, if the temperature of the reactor fluid entering the pressure vessel 220 is about 650° C., then the temperature of the sub-reaction zone 235 may be less than about 650° C. but greater than about 375° C. The reactor fluid and the product may flow from the reaction zone 240 out of the reactor through the outlet 225.

The product source fluid may include certain inorganic salts, such as thorium, chloride salts, sulfate salts and phosphate salts. Such inorganic salts may be insoluble at temperatures within the sub-reaction zone 235, the reaction zone 240 and/or the outer reaction zone 250. As such, the inorganic salts may come out of solution and remain in a solid state as they fall within the pressure vessel 220 to the trap 230. The flow of fluids within the pressure vessel 220 may be configured to facilitate the sedimentation of the dissolved inorganic salts, as well as char and other conversion waste products, within the trap 230. For example, the flow rate of one or more fluids (for example, for the reactor fluid including one or more dissolved product gasses) may be reduced or reversed. In addition, sedimentation of salts and waste may be facilitated by rapid conversion times and the greater density of the salts and waste compared to the reactor fluid.

Figure 3:
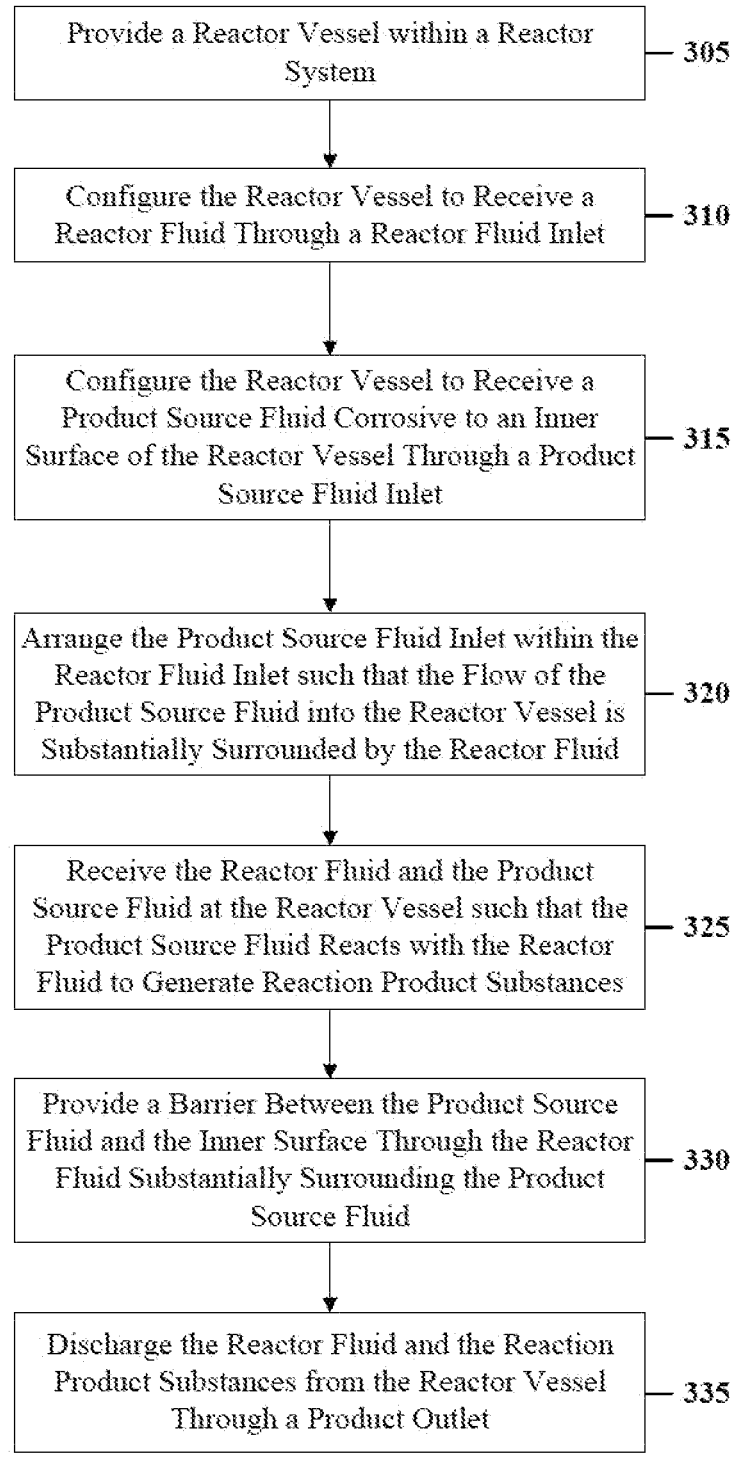
FIG. 3 depicts a flow diagram for an illustrative corrosion reduction method for a reactor system according to some embodiments.

FIG. 3 depicts a flow diagram for an illustrative corrosion reduction method for a reactor system according to some embodiments. A reactor vessel may be provided 305 within a reactor system such as a supercritical water reactor system. An illustrative system vessel is the reactor vessel 110 depicted in FIG. 1. According to some embodiments, the reactor vessel may be configured to house a reaction converting a product source fluid into one or more reaction products.

The reactor vessel may be configured to receive 310 a reactor fluid through a reactor fluid inlet. A non-limiting example of a reactor fluid includes water, such as supercritical water. The reactor vessel may also be configured to receive 315 a product source fluid through a product source fluid inlet. Non-limiting examples of product source fluids include a coal slurry, pulverized coal, a waste slurry, a toxic waste slurry, an e-waste slurry, a biomass slurry, and fluids including one or more fossil fuels. The product source fluid may, as the temperature increases, become corrosive to an inner surface of the reactor vessel. The product source fluid may be arranged 320 within the reactor fluid inlet such that the flow of the product source fluid into the reactor vessel is substantially surrounded by the reactor fluid. The reactor vessel may receive 325 the reactor fluid and the product source fluid such that the product source fluid reacts with the reactor fluid to generate reaction product substances. A barrier may be provided 330 between the product source fluid and the inner surface through the reactor fluid that substantially surrounds the product source fluid entering the reactor vessel. The reactor fluid and the reaction product substances may be discharged 335 from the reactor vessel through a product outlet. In an embodiment, the discharged reactor fluid may be re-used within the reactor system for another cycle of the reaction process.

EXAMPLES

Example 1

Supercritical Water Biomass Gasification System

A supercritical water biomass gasification system ("system") will be configured to generate a synthesis gas including at least about 50% by volume of $H_2$ from a biomass slurry formed from organic plant waste.

The reactor vessel will be formed from a nickel alloy material and will have a substantially cylindrical shape with a height of about 3.5 meters and a diameter of about 2 meters. A water inlet pipe will allow supercritical water to enter the reactor vessel at a pressure of about 22 megapascals and a temperature of about 700° C. The water inlet pipe will be located at a top portion of the reactor. The water inlet pipe will have a diameter of about 0.6 meters and will extend into the reactor vessel for about 1.5 meters. A slurry inlet pipe will be arranged within the water inlet pipe for the biomass slurry to enter the reactor vessel at a pressure of about 25 megapascals and a temperature of about 250° C. The slurry inlet pipe will be positioned substantially in the center of the water inlet pipe and will have a diameter of about 0.4 meters and will extend into the reactor vessel for about 0.75 meters. As such, 0.75 meters of the (reactor fluid) water inlet pipe will extend beyond the slurry inlet pipe into the reactor vessel to facilitate proper and managed mixing.

The supercritical water will flow into the reactor vessel at a flow rate of about 5 meters/second and the slurry will flow into the reactor vessel at a flow rate of about 1 meter/second. The flow of supercritical water into the reactor vessel will form a fluid layer having a thickness of about 2 centimeters that surrounds the biomass slurry and prevents the biomass slurry from contacting the inner surface of the water inlet pipe and the inner surface of the reactor vessel. The slurry will react with the supercritical water to form a gas product containing $H_2$ within a reaction zone that is located at least partially within the portion of the water inlet pipe extending beyond the slurry inlet pipe.

Waste products including char and precipitated inorganic salts will fall from the reaction zone and will be collected in a trap. The gas product will be dissolved in the supercritical water within the reactor vessel and will flow out of the reactor vessel through an outlet pipe and will be collected by a liquid/gas separator in fluid communication with the reactor vessel. The supercritical water will flow through the system to be used in another gasification cycle.

The flow of supercritical water surrounding the biomass slurry in the water inlet pipe and the reactor vessel will provide a barrier preventing the biomass slurry from contacting the inner surfaces thereof. Accordingly, the corrosive ions in the biomass slurry will not react with or cause corrosion of the inner surface of the water inlet pipe or the reactor vessel, prolonging the life of these components within the supercritical water biomass gasification system relative to a similar system lacking the dense fluid barrier.

Example 2

Supercritical Water Coal Reactor System

A manufacturer will use a supercritical water coal gasification system ("system") to produce gas products including $H_2$ and $CH_4$ from a slurry of pulverized coal. The coal slurry will include 15% by weight of coal pulverized by a Babcock & Wilcox (of Charlotte, N.C., USA) Roll Wheeler™ coal pulverizer. The gas products will be used to generate electricity to power certain of the manufacturer's facilities and excess electricity beyond the needs of the manufacturer will be sold on a regional electricity market.

The system will include a reactor vessel configured to provide a vessel for the reaction of the coal slurry with supercritical water to generate the gas products. A water heater and a water pump will be in fluid communication with the reactor vessel to generate supercritical water by heating water to a temperature of about 650° C. and pressurizing the water to about 28 megapascals before the water enters the reactor vessel. A coal slurry heater and a coal slurry pump will also be in fluid communication with the reactor vessel. The coal slurry heater will be configured to heat the coal slurry to about 300° C. and the coal slurry pump will be configured to pressurize the coal slurry to about 28 megapascals before the coal slurry enters the reactor vessel.

The reactor vessel will be formed substantially from Hastelloy® N and will have a cylindrical shape with a height of about 5 meters and a diameter of about 3 meters. The reactor vessel will include a water inlet pipe and a slurry inlet pipe formed substantially from titanium arranged at a top portion thereof. The water inlet pipe will extend into the reactor vessel for about 3 meters and will have a diameter of about 1 meter. The slurry inlet pipe will be arranged within the water inlet pipe to form an acceleration elbow having a ratio change in cross-sectional area of about 2:1. The slurry inlet pipe will extend into the reactor vessel within the water inlet pipe for about 1.5 meters.

The supercritical water contacting the slurry inlet pipe arranged therein will heat the coal slurry to about 300° C. before the coal slurry exits the slurry inlet pipe. The coal slurry will exit the slurry inlet pipe and will be encased by the supercritical water within the water inlet pipe. The coal slurry will be heated to about 650° C. and will react with the supercritical water within the 1.5 meters of the water inlet pipe between the end of the slurry inlet pipe and the end of the water pipe to form the gas products. The gas products will be dissolved within the supercritical water within the body of the reactor vessel and will exit the reactor vessel through an outlet pipe.

The supercritical water will flow from the reactor vessel through a heat exchanger in which heat from the supercritical water will be captured to produce steam for power generation. The gas products will be recovered by passing the supercritical water through a liquid/gas separator and will be pumped through a piping system to a power generation plant to produce electricity.

The pressure and temperature of the coal slurry as it flows through the slurry inlet will be below a highly corrosive level. The coal slurry will enter the water inlet pipe and the reactor vessel encased in the supercritical water. As such, the higher-temperature, more corrosive coal slurry will not contact the inner surface of the water inlet pipe or the reactor vessel. The supercritical water surrounding the coal slurry in the water inlet pipe and the reactor vessel will provide a barrier preventing the coal slurry from contacting the inner surfaces thereof, prolonging the life of the reactor vessel compared to a similar system lacking the dense fluid barrier.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A reactor system configured to reduce corrosion of portions thereof, the reactor system comprising:
    at least one reactor vessel comprising an inner surface, at least one reactor fluid inlet, and at least one product source fluid inlet, wherein the at least one reactor fluid inlet is configured to provide reactor fluid into the at least one reactor vessel, and wherein the at least one product source fluid inlet is configured to provide product source fluid into the at least one reactor vessel; and
    at least one product outlet configured to provide a discharge path for the reactor fluid and reaction product substances generated by a reaction of the product source fluid with the reactor fluid within the at least one reactor vessel,
    wherein the at least one product source fluid inlet is arranged co-axially within at least a portion of the at least one reactor fluid inlet, wherein the at least one reactor fluid inlet is configured to surround the at least one product source fluid inlet, the at least one reactor fluid inlet extends beyond the at least one product source fluid inlet into the at least one reactor vessel to create a barrier, and the at least one reactor fluid inlet has uniform diameter along the entire length inside the at least one reactor vessel such that a flow of the product source fluid within the at least one reactor vessel is substantially surrounded by a flow of the reactor fluid, and wherein the reactor fluid thereby operates to reduce corrosion by formation of the barrier between the product source fluid and at least a portion of the inner surface of the reactor vessel.

2. The reactor system of claim 1, wherein the reactor fluid comprises supercritical water, and wherein the product source fluid comprises a slurry.

3. The reactor system of claim 1, wherein the reactor fluid and the product source fluid are disposed within at least a portion of the at least one reactor vessel.

4. The reactor system of claim 1, wherein the reactor system is configured as one of: a coal gasification system, a biomass gasification system, a toxic waste gasification system, an electronic waste oxidation system, and a waste oxidation system.

5. The reactor system of claim 1, wherein the barrier has a thickness of about 1 centimeter to about 5 centimeters.

6. The reactor system of claim 1, further comprising a trap configured to receive reaction waste substances.

7. The reactor system of claim 6, wherein the reaction waste substances comprise salts, char, or a combination thereof.

8. The reactor system of claim 1, wherein the at least one reactor fluid inlet and the at least one product source fluid inlet are configured as a venturi elbow arrangement.

9. The reactor system of claim 1, wherein the at least one reactor fluid inlet extends beyond the at least one product source fluid inlet into the at least one reactor vessel by about 0.25 meters to about 2 meters.

10. The reactor system of claim 1, further comprising a reaction zone that comprises an area of the at least one reactor fluid inlet where the at least one product source fluid inlet does not extend within the at least one reactor fluid inlet,
    wherein the reaction zone is configured such that a first portion of the product source fluid reacts with a first portion of the reactor fluid within the reaction zone,
    wherein the reaction zone is configured such that a second portion of the product source fluid does not react with the reactor fluid within the reaction zone, and
    wherein the reaction zone is configured such that a second portion of the reactor fluid does not react with the product source fluid within the reaction zone.

11. The reactor system of claim 10, wherein the barrier comprises the second portion of the reactor fluid.

12. The reactor system of claim 10, wherein the barrier comprises at least one reaction product formed by the reaction of the first portion of the product source fluid and the first portion of the reactor fluid.

\* \* \* \* \*

UNITED STATES PATENT AND TRADEMARK OFFICE
CERTIFICATE OF CORRECTION

| | | |
|---|---|---|
| PATENT NO. | : 9,896,633 B2 | Page 1 of 1 |
| APPLICATION NO. | : 14/414382 | |
| DATED | : February 20, 2018 | |
| INVENTOR(S) | : Graf et al. | |

It is certified that error appears in the above-identified patent and that said Letters Patent is hereby corrected as shown below:

In the Specification

In Column 7, Line 10, delete "reactor fluid inlet 210" and insert -- reactor fluid inlet 215 --, therefor.

In Column 7, Lines 10-11, delete "product source fluid inlet 215" and insert -- product source fluid inlet 210 --, therefor.

In Column 8, Line 13, delete "reactor vessel 220," and insert -- reactor vessel 200, --, therefor.

In Column 9, Line 36, delete "product fluid inlet 210," and insert -- product source fluid inlet 210, --, therefor.

In Column 10, Line 1, delete "reactor fluid 220" and insert -- reactor fluid --, therefor.

In Column 14, Line 46, delete "recitation no" and insert -- recitation, no --, therefor.

In Column 14, Line 67, delete "general such" and insert -- general, such --, therefor.

In Column 15, Line 8, delete "general such" and insert -- general, such --, therefor.

Signed and Sealed this
Nineteenth Day of June, 2018

Andrei Iancu
*Director of the United States Patent and Trademark Office*